(12) United States Patent
Hiranaka

(10) Patent No.: US 6,661,840 B1
(45) Date of Patent: Dec. 9, 2003

(54) IMAGE ENCODER AND METHOD OF THE SAME

(75) Inventor: Daisuke Hiranaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/720,467

(22) PCT Filed: Apr. 20, 2000

(86) PCT No.: PCT/JP00/02592

§ 371 (c)(1),
(2), (4) Date: Apr. 27, 2001

(87) PCT Pub. No.: WO00/65842

PCT Pub. Date: Nov. 2, 2000

(30) Foreign Application Priority Data

Apr. 23, 1999 (JP) .......................................... 11-116855

(51) Int. Cl.[7] ................................................. H04N 7/12
(52) U.S. Cl. .................................................. 375/240.03
(58) Field of Search ...... 348/420.1; 375/240.01–240.07, 375/240.12–240.16; H04N 7/12

(56) References Cited

U.S. PATENT DOCUMENTS

| | | | |
|---|---|---|---|
| 5,134,476 A | | 7/1992 | Aravind et al. |
| 5,144,424 A | | 9/1992 | Savatier |
| 5,150,208 A | * | 9/1992 | Otaka et al. ............. 348/420.1 |
| 5,301,242 A | * | 4/1994 | Gonzales et al. ....... 375/240.15 |
| 5,542,008 A | | 7/1996 | Sugahara et al. |
| 5,583,573 A | * | 12/1996 | Asamura et al. ....... 375/240.04 |
| 5,661,523 A | | 8/1997 | Yamane |
| 5,703,646 A | | 12/1997 | Oda |
| 5,710,595 A | * | 1/1998 | Hang et al. ............. 375/240.05 |
| 5,929,916 A | * | 7/1999 | Legall et al. ........... 375/240.24 |
| 6,385,241 B1 | * | 5/2002 | Saw ........................ 375/240.03 |

FOREIGN PATENT DOCUMENTS

| | | |
|---|---|---|
| EP | 0 067 969 | 12/1982 |
| EP | 0 444 918 | 9/1991 |
| EP | 0 645 930 | 3/1995 |
| JP | 2-305083 | 12/1990 |
| JP | 3-270388 | 12/1991 |
| JP | 4-156794 | 5/1992 |
| JP | 5-336513 | 12/1993 |
| JP | 6-113274 | 4/1994 |
| JP | 7-288810 | 10/1995 |
| JP | 11-313318 | 11/1999 |
| WO | WO 94/24822 | 10/1994 |

* cited by examiner

*Primary Examiner*—Richard Lee
(74) *Attorney, Agent, or Firm*—Frommer Lawrence & Haug LLP; William S. Frommer; Gordon Kessler

(57) ABSTRACT

An image encoder and its processing method for compression-encoding a dynamic image at a variable encoding rate in the case of an application required to perform real-time processing. A variable bit rate (VBR) control section (22) determines a VBR control quantizing scale VBRq according to a VBR buffer value held in a VBR buffer recording section (21). A constant bit rate (CBR) control section (23) determines a CBR control quantizing scale CBRq according to an inputted maximum bit rate BRmax. A quantizing scale comparing section (25) outputs the CBRq during constant rate encoding and outputs the larger one of the VBRq and CBRq during variable rate encoding. An image compression-encoding section (24) encodes the inputted image signal at a quantizing scale outputted from the quantizing scale comparing section (25) and outputs a bit stream (S20).

25 Claims, 8 Drawing Sheets

IMAGE ENCODER AND METHOD OF THE SAME

TECHNICAL FIELD

The present invention relates to an apparatus for encoding an image, more particularly relates to an image encoder capable of encoding a moving picture at a variable bit rate and a method of the same.

BACKGROUND ART

In a general image encoding apparatus, the digitized image signal is encoded at a constant bit rate or at a variable bit rate. A bit stream encoded at a constant bit rate has a constant bit rate and does not depart much from an object bit rate. As opposed to this, a bit stream encoded at a variable bit rate does not have a constant bit rate and varies in accordance with the characteristics of the image signal to be encoded. Note that in this case, compression and encoding are performed on an image signal within a range not exceeding a maximum bit rate subscribed by standards.

When encoding a digitized moving picture signal, encoding bit rate control, that is, control so as to give a desired bit rate when viewing a certain time span of a coding series generated by encoding, is performed. A plurality of standards for compressing and encoding an image signal changing over time, a so-called motion picture, at a high efficiency have been proposed hitherto. Among them, the MPEG2 standard has currently gathered attention and come into practical use in a variety of fields of application such as communication, broadcasting, and media storage. Digital versatile disks (DVD), one of the applications, is expected to be increasingly widely used in the future as recording media for compressing, encoding, and storing motion pictures based on the MPEG2 standard due to its large capacity, low cost, and ease in handling.

The MPEG2 standard does not define the above encoding control for control of the bit rate. Therefore, it is sufficient that the amount of encoded information be within a certain range subscribed by standards. Normally, a variable bit rate is used in authoring DVDs (editing work for preparing a DVD title). The encoding method at this time investigates the encoding difficulty of the source as a whole in a first encoding and performs encoding assigning an amount of code corresponding to the encoding difficulty in the second encoding to realize a variable bit rate. As a result, a larger code amount is assigned to an image signal having a high difficulty, while a code amount assigned to an image signal having a low difficulty is suppressed and therefore uniformity of the image quality can be attained.

In an application recording a motion picture signal obtained by an image pickup like a video camera on a recording medium in real time, the successively input motion picture signal has to be compressed, encoded, and recorded sequentially. In such a case, since the entire image to be encoded cannot be investigated in advance, the image is normally compressed and encoded at a constant bit rate using a fixed code amount for every GOP (group of pictures) in units of, for example, about 15 frames.

FIG. 7 is a view of a view of an encoding rate when encoding an image signal at a constant bit rate. As shown in FIG. 7, when performing compression encoding on an image signal at a constant bit rate, a bit rate of an obtained coding series is made constant to be almost an object bit rate regardless of the characteristics of the image. To realize the constant bit rate, a bit rate control portion of the image encoder rapidly changes a quantizer scale in units of macroblocks comprised of a several blocks for the object bit rate given in advance.

The compression and encoding by a constant bit rate make the bit rate constant regardless of the characteristic of the image signal, therefore the picture quality is good in a scene wherein the encoding difficulty is low, but there is a disadvantage that the picture quality deteriorates in a scene wherein the encoding difficulty is high.

For this reason, it is desired that a bit rate is set variable so that the code amount obtained in compression and encoding falls in a range of a prescribed value while maintaining the picture quality to be not less than a fixed level. FIG. 8 is an example of a bit rate of a coding series obtained by variable bit rate control. In the variable bit rate control, the quantizer scale is controlled for example in units of GOPs fro an object bit rate. Namely, a response speed of the quantizer scale is made slow. As a result, as shown in FIG. 8, the bit rate becomes low in portions where encoding difficulty is low, while the bit rate becomes high in portions where encoding difficulty is high. By changing the bit rate over time in accordance with the encoding difficulty, picture quality of a reproduced image can be maintained to be almost uniform.

In an application like a video camera wherein an image processing is required in real time, however, the characteristics of the entire image signal cannot be investigated in advance. Therefore, the bit rate is set based on experience. Since images obtained from an actual image pickup device changes from moment to moment and the encoding difficulty also changes over time, the encoding bit rate exceeds a maximum bit rate designated at a sequence header at the top of a bit stream in the portions where encoding difficulty is high in some cases. Therefore, it is impossible to generate a bit stream based on standards in all cases merely by making the response speed of the quantizer scale in accordance with changes of encoding difficulty.

Furthermore, when considering an application to consumer goods, a simple algorithm is desired by which a circuit scale of a hardware and processing amount of software are not increased much.

DISCLOSURE OF INVENTION

The present invention was made in consideration with such a circumstance and has as an object thereof to provide an image encoder and processing method capable of realizing compression and encoding of a motion picture at a variable bit rate in an application where real time processing is required.

To attain the above object, an image encoder of the present invention claims*.

BEST MODE FOR CARRYING OUT THE INVENTION

Figure 1:
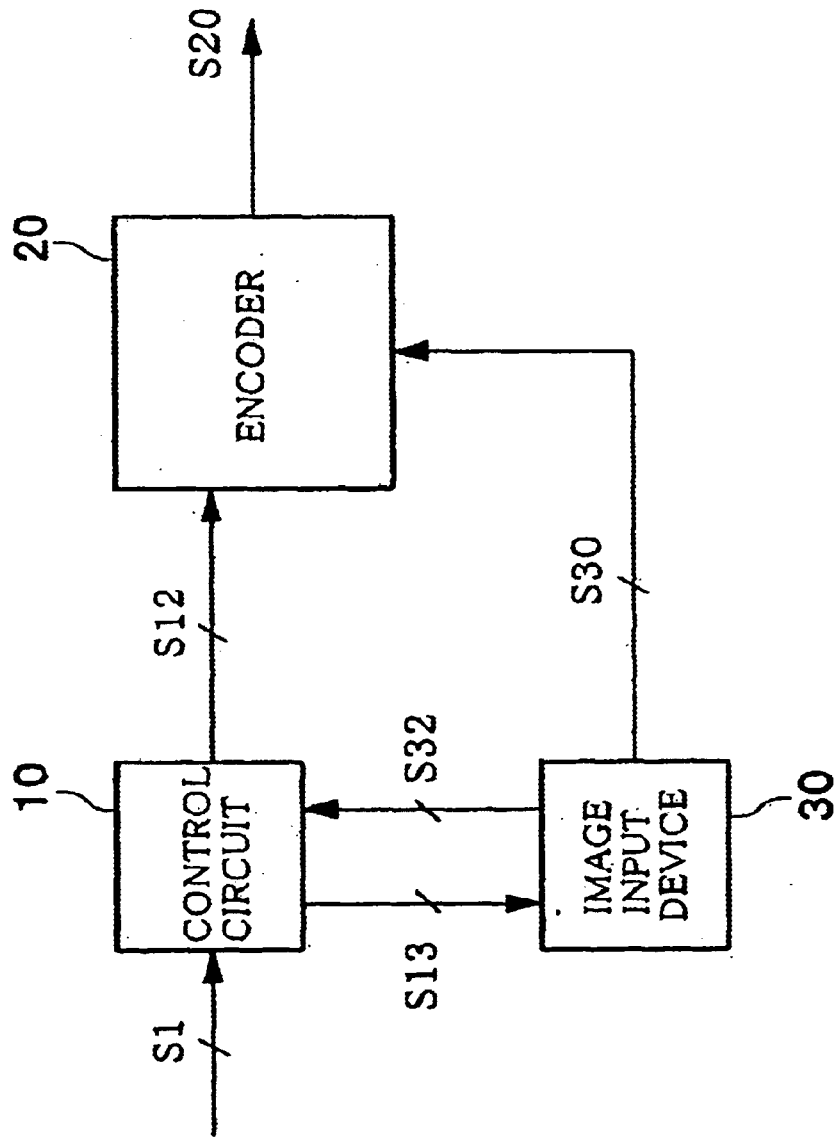
FIG. 1 is a circuit diagram of an image encoder according to an embodiment of the present invention.

FIG. 1 is a view of the configuration of an embodiment of an image encoder according to the present invention.

As shown in the figure, an image encoder of the present invention comprises a control circuit 10, an encoder 20, and an image input device 30.

The control circuit 10 respectively outputs to the image input circuit 30 and the encoder 20 control signals S12 and S13 in accordance with a control signal S1 input from the outside and controls their operations.

The image input device 30 outputs image data S30 obtained by digitizing the image signal to the encoder 20. The image input device is any pickup such as a video camera or image reproducing apparatus for reproducing an image signal from another recording medium and need only have the function of generating an image signal by some means and converting an image signal in an analog format to a digital signal.

The image input device 30 generates image information data S32 in accordance with a type, characteristics, etc. of the input image signal and supplies the same to the control circuit 10. The control circuit 10 receives the image information data S32 and outputs a compression and encoding parameter S12 to the encoder 20 in accordance with the characteristics etc. of the input image signal. Note that the compression and encoding parameter S12 is comprised of a plurality of parameters or signals such as an object bit rate, maximum bit rate, and variable bit rate instruction signal which will be explained later on.

The encoder 20 performs, in accordance with the compression and encoding parameter S12 from the control circuit 10, compression and encoding on the digital image data S30 sent from the image input device 30 based on a predetermined algorithm and outputs a bit stream S20. Note that as a result of compression and encoding of the image data by the encoder 20, the amount of data of the bit stream S20 is greatly reduced compared with the image data S30 before being subjected to the compression and encoding. As a result, the transfer capacity of a channel or a storage capacity of an image recording medium can be greatly reduced by transferring or storing of information of the bit stream S20 compressed and encoded by the encoder 20.

In the encoder 20 of the present embodiment, by using a so-called variable bit rate for controlling a bit rate at the time of compressing and encoding an image signal in accordance with the input image data, an appropriate bit rate can be set in accordance with characteristics of the image data and a uniform picture quality of the entire image and the compression efficiency can be improved.

Figure 2:
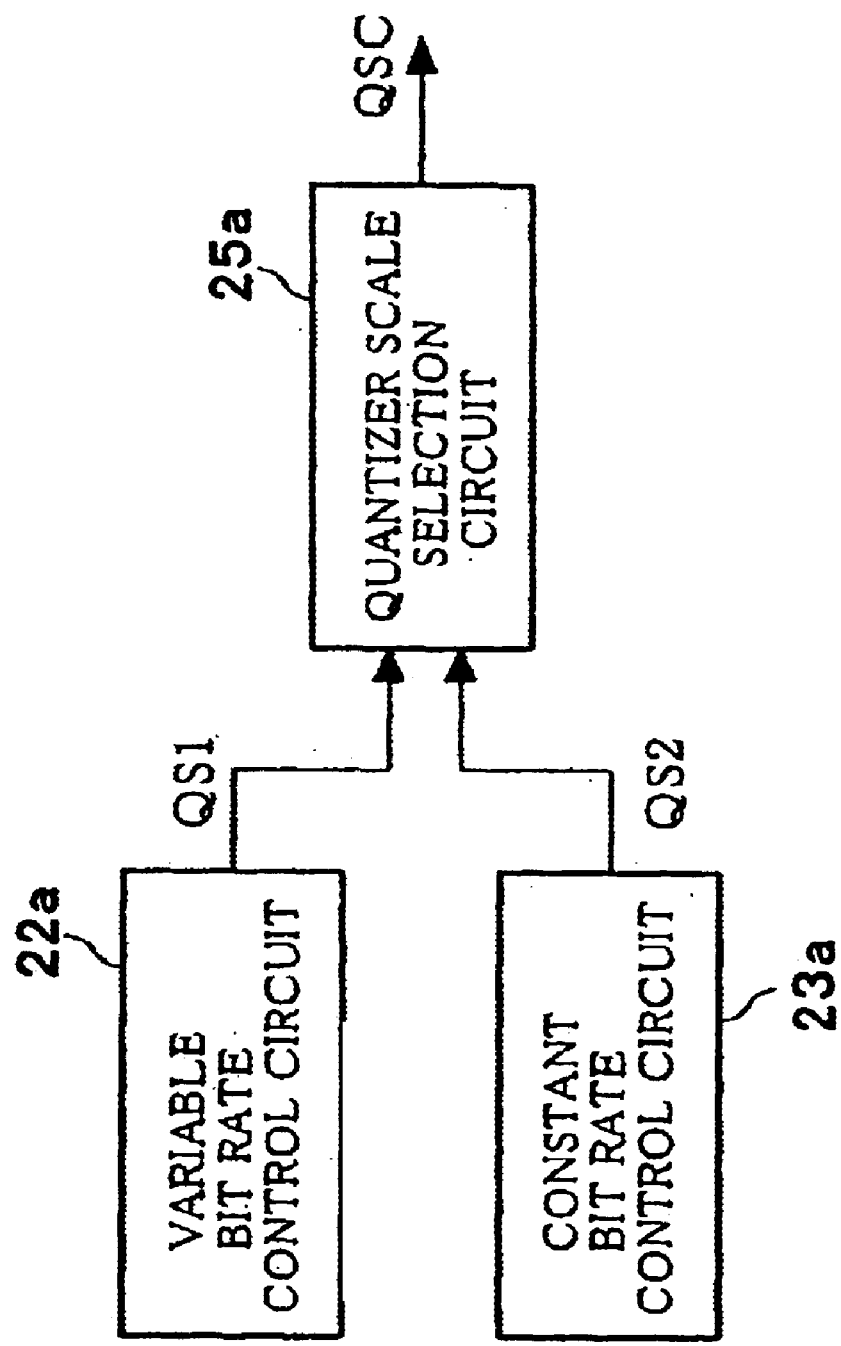
FIG. 2 is a block diagram of concepts of an image encoder of the present invention.

FIG. 2 is a block diagram of the configuration of the encoder 20 in the present embodiment. As shown in FIG. 2, the encoder 20 comprises a variable bit rate control circuit 22a, a constant bit rate control circuit 23a and a quantizer scale select circuit 25a.

The variable bit rate control circuit 22a is a first quantizer scale setting means for setting a first quantizer scale for performing image encoding in a first image processing unit and setting a gently changing first quantizer scale QS1 in accordance with encoding difficulty of an input image signal in units of a first image processing unit, for example, in units of GOPS comprised of a plurality of pictures with respect to an object bit rate.

The constant bit rate control circuit 23a is a second quantizer scale setting means for setting a rapidly changing second quantizer scale QS2 in order not to exceed a maximum bit stream with respect to the maximum bit stream designated by a sequence header at the top of the bit stream in units of a second image processing unit, for example, in units of pictures or macroblocks, which is shorter than said first image processing unit (GOP)

the quantizer scale select circuit 25a compares the first quantizer scale QS1 set by the variable bit rate control circuit 22a with the second quantizer scale QS2 set by the constant bit rate control circuit 23a and outputs the larger quantizer scale as a quantizer scale QSC for performing encoding processing on the input image signal.

As explained above, the image encoder of the present embodiment obtains a gently changing first quantizer scale QS1 in units of long image processing unit, for example, in units of GOPs with respect to an object encoding bit rate in accordance with encoding difficulty of an input image, obtains a quickly changing second quantizer scale QS2 in units of short image processing units, for example, in units of macroblocks with respect to a maximum bit rate prescribed by standards, furthermore, selects the larger of the two as a quantizer scale QSC for performing encoding on the input image.

By setting the quantizer scale QSC as above, an input image signal can be encoded at an encoding bit rate close to the object bit rate in average corresponding to the encoding difficulty of the input image signal, and it becomes possible to guarantee not to exceed the maximum bit rate prescribed by the standards.

Figure 3:
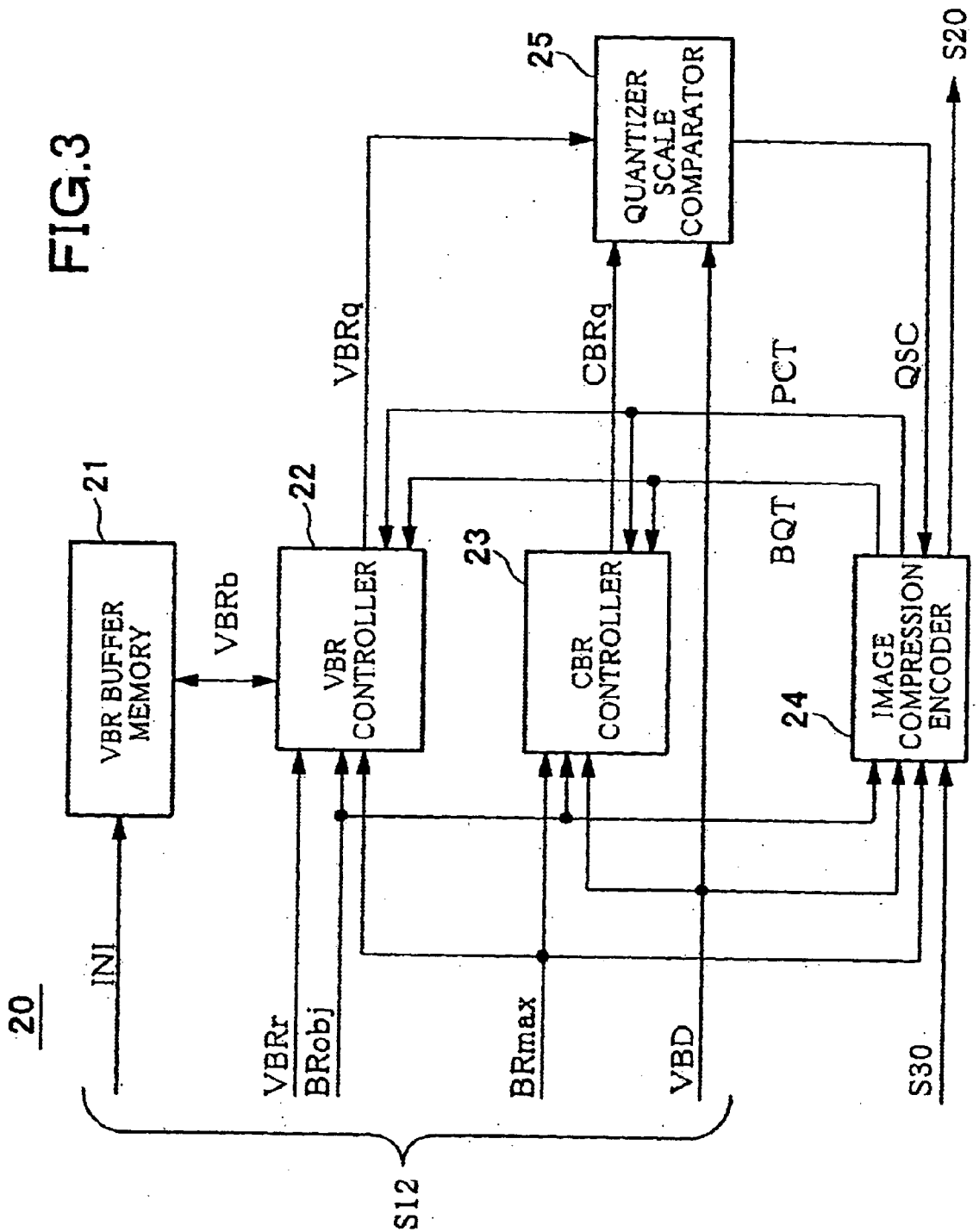
FIG. 3 is a block diagram of the configuration of an encoder in an image encoder of the present invention.

FIG. 3 is a view of a specific example for realizing the image encoding processing of the present invention and is a block diagram of the configuration of an encoder 20. As shown in FIG. 3, the encoder 20 comprises a VBR buffer memory 21, VBR controller 22, CBR controller 23, image compression encoder 24, and quantizer scale comparator 25. Below, the components of the encoder 20 and operations of the encoder 20 as a whole will be explained.

VBR Buffer Memory 21

The VBR buffer memory 21 holds a parameter VBRb called a VBR buffer value (hereinafter referred to as a VBR buffer value) and is provided for making the amount of deviation from an object bit rate in a series of encoding processing small in total value. Before starting the processing, the VBR buffer memory 21 stores a VBR buffer initial value INI input from the control circuit 10 shown in FIG. 1. The simplest method of initializing is, before starting the processing, to initialize in accordance with an initialize control signal from the control circuit 10 and to set the initializing value to be "0" or a value given in advance.

After starting compression and encoding, the initial value INI stored in the VBR controller 20 is provided, the VBR buffer value VBRb is input from the VBR controller 22 at the time of completing the encoding, which is stored, and the stored VER buffer value VBRb is output to the VBR controller 22 in the next encoding.

VBR Controller 22

The VBR controller 22 sets a VBR quantizer scale VBRq in accordance with a VBR response value VRT, object bit rate $BR_{obj}$, and maximum bit rate $BR_{max}$ input from the control circuit 10 and outputs the same to the quantizer scale comparator 25.

The VBR controller 22 has as internal parameters the VBR buffer value VBRb for obtaining an output VBR quantizer scale, a remaining bit quantity RBG in a GOP at the time of encoding at the object bit rate, and a response speed VBRr indicating a response speed of the VBR quantizer scale.

In the VBR controller 22, the VBR quantizer scale VBRq can be obtained from the equation below.

$$VBRq = VBRb/(2^n \cdot VBRr) \qquad (1)$$

In equation (1), n is a calculation parameter set in accordance with an application etc. and is assumed for example to be n=9.

When the VBR quantizer scale VBRq becomes "1", the generated bit quantity abruptly increases and VBR; rate control becomes unstable, thus countermeasures such as forcibly changing the VBRq to be "2" are taken when the VBRq calculated from equation (1) is not more than "1".

Furthermore, by taking note of the difference of the I/P/B pictures, a value obtained by multiplying the value obtained from equation (1) with 1.4 is made the quantizer scale VBRq when the coding type is a B-picture. Namely, when in the case of a B-picture, the quantizer scale is always set to be quantizer scales of I- and P-pictures multiplied with 1.4. This is on an assumption that when assigning an encoding amount saved in a B-picture by encoding the B-picture a little larger comparing with the I- and P-pictures to encoding amounts of I- and P-pictures, the S/N of the I- and P-pictures is improved and the S/N of the B-picture generated by referring thereto is also improved, so the S/N is totally improved.

In the VBR controller 22, the quantizer scales of the I/P/B-pictures are determined in a simple method as explained above, but by inspecting the encoding difficulties of the respective pictures, the quantizer scales can be made different in accordance therewith.

An object bit quantity for every GOP is set in the remaining bit quantity RBG in the GOP. Then, for example when a generated bit quantity for every MB (macro block) is received, the amount is subtracted from the object bit quantity. The amount of deviation from the object bit quantity remains in the RBG at the end of each GOP, thus, which is subtracted from the VBR buffer value VBRb. At this time, when the VBR buffer value VBRb becomes negative, it is set to be "0". Also, when the VBR buffer value VBRb comes close to overflowing, it is fixed to be a maximum value.

As explained above, the initial value of the VBR buffer value VBRb at the time of starting encoding is input from the VBR buffer memory 21. Here, for example, when the VBR buffer value input from the VBR buffer memory 21 is not "0", the value is used, while when it is "0", a value obtained from the equation below is used.

$$VBRb = m \cdot VBRr/(BR_{obj} \cdot 2^k) \qquad (2)$$

In equation (2), m and k are calculation parameters. Here, for example m=2.5×10$^7$ and k=10.

As the response speed VBRr in equation (2), a value supplied from the control circuit 10 shown in FIG. 1 is used. For example, when the response speed VBRr is set at about 200, a response speed of tens of seconds is obtained, while when set at about 4000, a response speed of tens of minutes is obtained. When completing the encoding, the VBR buffer value VBRb calculated from equation (2) is transferred to the VBR buffer memory 21 and stored therein.

A value obtained in the equation below is set to the remaining bit quantity RBG in the GOP at first.

$$RBG = BR_{obj} \cdot N/PCR \qquad (3)$$

In equation (3), N is the interval of I-pictures and PCR is a picture rate.

CBR Controller 23

The CBR controller 23 sets a CBR quantizer scale CBRq in response to the object bit rate $BR_{obj}$, maximum bit rate $BR_{max}$, and VBR instruction signal VBD input from the control circuit 10 and outputs the same to the quantizer scale comparator 25.

In the present embodiment, the CBR controller 23 performs, for example, rate control of the CBR based on an algorithm of a test mode 5 (TM5) prescribed by the MPEG2 standards.

In TM5, image encoding processing is performed in units of GOPs. A bit amount R to be assigned to a GOP is determined from the number of pictures and bit rates included in every GOP. A remaining amount ΔR (positive or negative) of the bit amount in the previous GOP of the GOP being processed is added to the amount of on-going processing. Also, an object bit amount for a picture to be encoded from now is determined from the bit amount R for every picture and encoding difficulty of each of the picture types (I/B/P). Then, a bit amount actually generated after completing the encoding is subtracted from the object bit amount and a remaining amount ΔR of the bit amount is calculated.

In processing in units of macroblocks (MB), pictures are encoded in units of MBs, and when the generated bit amount comes close to exceed the object bit amount in every MB, the quantizer scale is set to be large, while when the generated bit amount comes close to be under the object bit amount, the quantizer scale is set to be small. Furthermore, considering the fact that human visual characteristics is sensitive to deterioration of picture quality on a flat portion in a screen, the quantizer scale is set to be large in a portion where an image is relatively flat, while the quantizer scale is set to be small in a fine image portion.

Note that the image encoder of the present invention is not limited to performing rate control in CBR based on an algorithm of TM5, and may perform the rate controlling based on other control format.

The CBR controller 23 in the image encoder of the present embodiment is a CBR controller installed in an MPEG encoder of the related art being improved. The CBR controller 23 of the present embodiment is additionally given the functions below.

At first, the CBR controller 23 controls the CBR quantizer scale 1 in accordance with the VBR instruction signal VBD input from the control circuit 10 shown in FIG. 1. Specifically, when the VBR instruction signal is "0", the rate is controlled based on the object bit rate $BR_{obj}$, while when the VBR instruction signal VBD is "1", the rate is controlled based on the maximum bit rate $BR_{max}$. Namely, when the VBR instruction signal VBD is "0", normal CBR rate control is performed and the quantizer scale is controlled so that the bit rate of a bit stream obtained by the compression and encoding does not deviate with respect to the object bit rate $BR_{obj}$. On the other hand, when the VBR instruction signal VBD is "1", the VBR rate is controlled and the quantizer scale is controlled so that the bit stream obtained in the compression and encoding does not exceed the maximum bit rate $BR_{max}$.

Next, the next GOP's object bit rate R is determined in the TM5 of the MPEG2 for every GOP. At the end of the GOP, the R is subtracted from a bit quantity generated in the GOP. After that, this is deemed the remaining bit quantity of the GOP and indicated by ΔR. Then, the remaining bit quantity ΔR is added to the object bit quantity R of the next GOP, but when the VBR instruction signal VBD is "1", the processing is not performed. This is because when the VBR instruction signal VBD is "1", the quantizer scale is controlled by the VBR rate control and the object bit quantity R is left at the end of the next GOP in the most cases (namely, ΔR>0). When adding this to the next GOP's object bit quantity R, it could end up in overflow and when an image exceeding the maximum bit rate is input, the quantizer scale is not raised, and a VBV (video buffering verifier) ends up in underflow.

The next GOP's object bit rate is determined for every GOP in the TM5 of the MPEG2. Due to the above additional functions, the CBR controller 23 of the present embodiment performs three different kinds of processing as described below in accordance with the input VBR instruction signal VBD, and the next GOP's object bit quantity R is determined.

1. When the VBR instruction signal VBD=0, the next GOP's object bit quantity $R_{i+1}$ is calculated from the next equation in accordance with the present GOP's remaining bit quantity $\Delta R_i$. Here, i indicates the number of the GOP.

$$R_{i+1}=BR_{obj} \cdot N/PCR+\Delta R_i \quad (4)$$

Note that in equation (4), N is the interval of I-pictures and PCR is a picture rate the same as in the above equation (3).

2. When the VBR instruction signal VBD=1 and the remaining bit quantity $\Delta R_i$ of a GOP immediately before the GOP is negative ($\Delta R_i<0$), the next GOP's object bit quantity $R_{i+1}$ is calculated from the next equation.

$$R_{i+1}=BR_{max} \cdot N/PCR+\Delta R_i \quad (5)$$

3. When the VBR instruction signal VBD=1 and the remaining bit quantity $\Delta R_i$ of a GOP immediately before the GOP is positive or "0" ($\Delta R_i \geq 0$), the next GOP's object bit quantity $R_{i+1}$ is calculated from the next equation.

$$R_{i+1}=BR_{max} \cdot N/PCR \quad (6)$$

The above case 1 is the same processing as the normal processing of the TM5 of the MPEG2. The CBR is controlled. The remaining bit quantity ΔR for every GOP is always fed back to the next GOP's object bit quantity $R_{i+1}$, which is corrected in accordance with the remaining bit quantity $\Delta R_i$ of the immediately before GOP.

In the cases 2 and 3, the VBR is controlled and the next GOP's object bit quantity is calculated in accordance with the remaining bit quantity ΔR of every GOP so as not to exceed the maximum bit rate $BR_{max}$. When the remaining bit quantity $\Delta R_i$ is negative in the GOP immediately before, as shown in equation (5), the remaining bit quantity $\Delta R_i$ is fed back to the next GOP's object bit quantity in the GOP immediately before and the next GOP's object bit quantity $R_{i+1}$ is corrected to be less. On the other hand, when the remaining bit quantity $\Delta R_i$ of the GOP immediately before is positive or "0", the remaining bit quantity $\Delta R_i$ of the GOP immediately before is not fed back for the above reason, and the next GOP's object bit quantity $R_{i+1}$ is determined in accordance with the maximum bit $BR_{max}$ etc. as shown in equation (6).

The CBR controller 23 obtains the CBR quantizer scale CBRq based on the GOP's object bit quantity calculated as above and supplies the same and the VBR quantizer scale VBRq obtained in the VBR controller 22 to the quantizer scale comparator 25.

Quantizer Scale Comparator 25

The quantizer scale comparator 25 calculates a base quantizer scale QSC in accordance with the VBR quantizer scale VBRq, CBR quantizer scale CBRq, and VBR instruction signal VBD input from the CBR controller 23 and supplies the same to the image compression encoder 24.

For example, when the VBR instruction signal VBD is "0", the quantizer scale comparator 25 outputs the CBR quantizer scale CBRq to the image compression encoder 24. As a result, since the bit rate is controlled based on the normal CBR rate control, the quantizer scale is controlled so that the bit rate does not always largely depart from the object bit rate $BR_{obj}$.

On the other hand, when the VBR instruction signal VBD is "1", the quantizer scale comparator 25 compares the VBR quantizer scale VBRq with the CBR quantizer scale CBRq and outputs the larger to the image compression encoder 24. As a result, the bit rate is controlled based on the VBR rate control, and the quantizer scale is controlled so that the bit rate does not exceed the maximum bit rate $BR_{max}$.

Image Compression Encoder 24

The image compression encoder 24 compresses and encodes the image data S30 input from the image input device 30 shown in FIG. 1 in accordance with the object bit rate $BR_{obj}$, maximum bit rate $BR_{max}$, VBR instruction signal VBD, and quantizer scale QSC supplied from the quantizer scale comparator 25 and outputs a bit stream BSM. Here, the bit stream BSM is identical with an output signal S20 from the encoder 20 in FIG. 1. Furthermore, the image compression encoder 24 generates a bit quantity BQT indicating a bit quantity generated by the compression and encoding and a PCT signal indicating a picture coding type and outputs them to the VBR controller 22 and the CBR controller 23, respectively.

Figure 4:
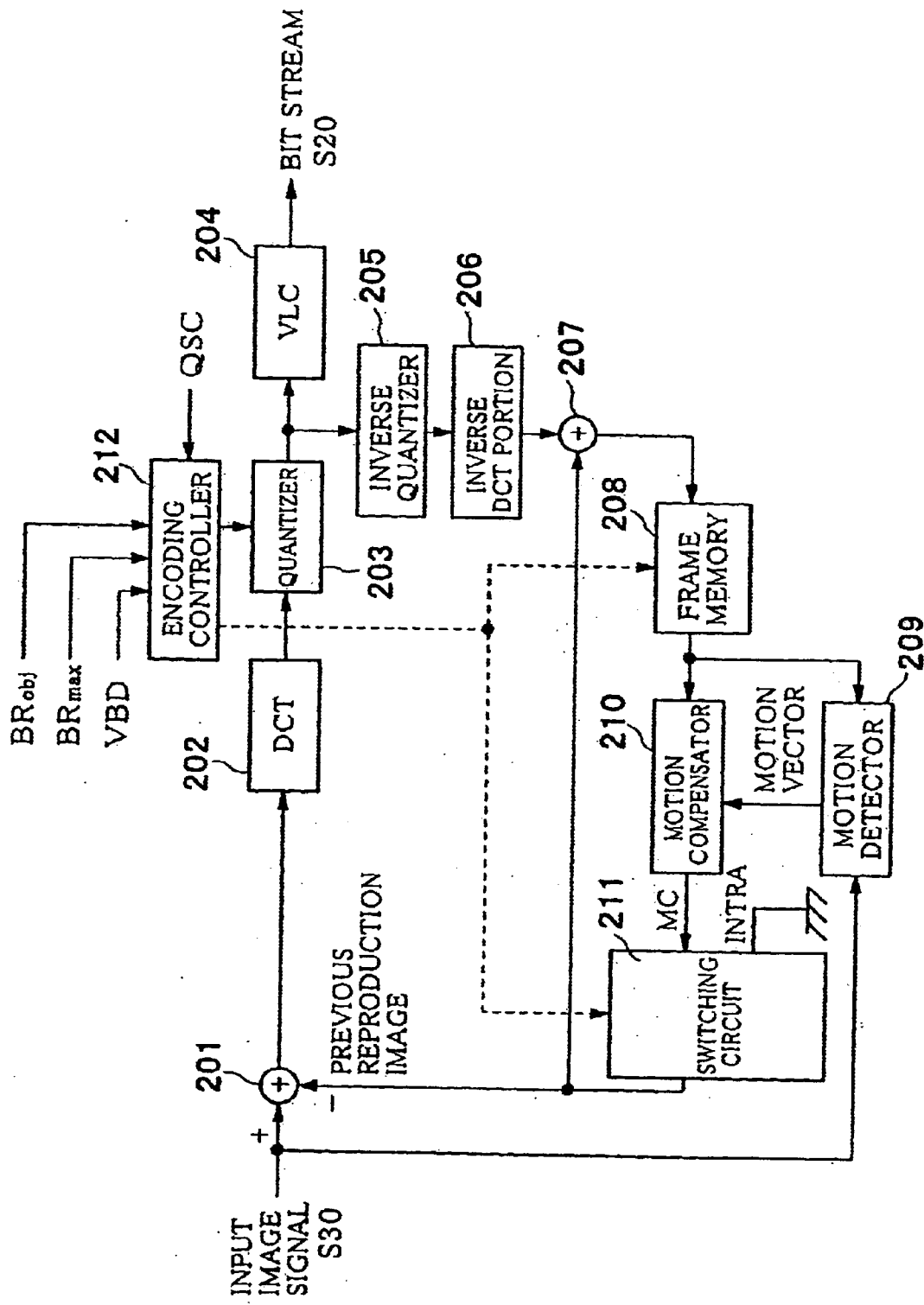
FIG. 4 is a block diagram of the configuration of an image compression encoder of the encoder shown in FIG. 2.

FIG. 4 is a block diagram of an example of the configuration of the image compression encoder 24. Below, the configuration and operations of the image compression encoder 24 will be explained with reference to FIG. 4.

As shown in the figure, the image compression encoder 24 comprises an adder 201, a DCT portion 202, a quantizer 203, a variable length coder (VLC) 204, an inverse quantizer 205, an inverse DCT portion 206, an adder 207, a frame memory 208, a motion detector 209, a motion compensator 210, a switch circuit 211, and. encoding controller 212.

The difference of the image signal S30 input to the image compression encoder 24 and a reproduction image signal input from the switch circuit 211 is obtained in the adder 201 and output to the DCT portion 202. During an intra-picture (I-picture) mode, a meaningful image is not input from the switch circuit 211 (the output from the switch circuit during this mode is "0" in FIG. 4), so the image data input to the adder 201 is output as it is to the DCT portion 202. During a motion compensation prediction mode, image data based on an image reproduced before that is input from the switch circuit 211, so the difference is obtained in the adder 201 and the error is input to the DCT portion 202.

The DCT portion 202 performs discrete cosine transform (DCT) on the image signal input from the adder 201 to reduce spatial redundancy. A transform coefficient obtained by the DCT is input to the quantizer 203.

The quantizer 203 quantizes the transform coefficient obtained from the DCT portion 202 in accordance with the quantization rate input from the controller 213 and outputs it to the variable length coder 204 and inverse quantizer 205. Note that the quantizer scale of the quantizer 203 is controlled by the encoding controller 212.

The variable length coder 204 encodes the quantized transform coefficient to a variable length to generate an encoded image bit stream S20 and successively outputs the same.

The encoding controller 212 controls the quantization rate of the quantizer 203, recording of image data to a frame memory 208, switching of the switch circuit, etc. As shown in the figure, the encoding controller 212 sets a predetermined quantizer scale to the quantizer 203 in accordance with the object bit rate $BR_{obj}$ input from the control circuit shown in FIG. 1, maximum bit rate $BR_{max}$, VBR instruction signal VBD, and quantizer scale QSC from the quantizer scale comparator 25 shown in FIG. 3 and controls the quantization rate.

The transform coefficient quantized by the quantizer 203 is input to the inverse quantizer 205. The transform coefficient is inversely quantized in the inverse quantizer 205 and further subjected to an inverse discrete cosine transform (inverse DCT) in the inverse DCT portion 206. When in a mode of motion compensation prediction, the inversely DCT'ed image signal and; an image signal obtained by the above motion compensation prediction are added in the adder 207 to be returned to the original image signal and stored in the frame memory 208. When in an intra-picture mode, the image signal inversely DCT'ed in the inverse DCT portion 206 is stored as it is in the frame memory 208.

When performing the motion compensation prediction, the image signal stored in a frame memory 208 is used. Namely, motion is detected in the motion detector 209 from the next image source signal to detect the motion vector based on the image signal stored in the frame memory 208. Furthermore, based on the motion vector, motion compensation prediction is performed in the motion compensator 210. Then, the image signal obtained by the motion compensation prediction is output to the adder 201 via the switch circuit 211 and the difference of the input image source signal is obtained.

The image compression encoder 24 having the above configuration encodes the input image signal S30 to generate a bit stream. When the VBR instruction signal VBD is "0", an object bit rate BRobj is output to the bit rate of the sequence header, while when the VBR instruction signal VBD is "1", the maximum bit rate BRmax is output to the bit rate. When a quantizer scale is set for each of the macro blocks (MB), based thereon, the quantizer scale is changed aiming at the visual effect based on step 3 of bit rate control in the TM5 of the MPEG2 and the changed quantizer scale is used for quantization. Then, a bit stream generated for every MB is output.

Also, the image compression encoder 24 has the general function of an image encoding device in the MPEG2 of preventing a VBV from underflowing by forcibly cutting a DCT coefficient when the bit rate control by using the quantizer scale is not performed well.

Due to the above image compression encoder 24, it is possible to realize encoding of an image signal at a variable bit rate by one encoding operation, that is, by one path processing. Therefore, for example in an image processing apparatus picking up and recording an image in real time such as a video camera, image encoding at a variable bit rate can be realized by one encoding operation, and uniformity of picture quality can be realized in an image signal having different characteristics, and furthermore the encoding efficiency can be improved by variable bit rate control.

Figure 5:
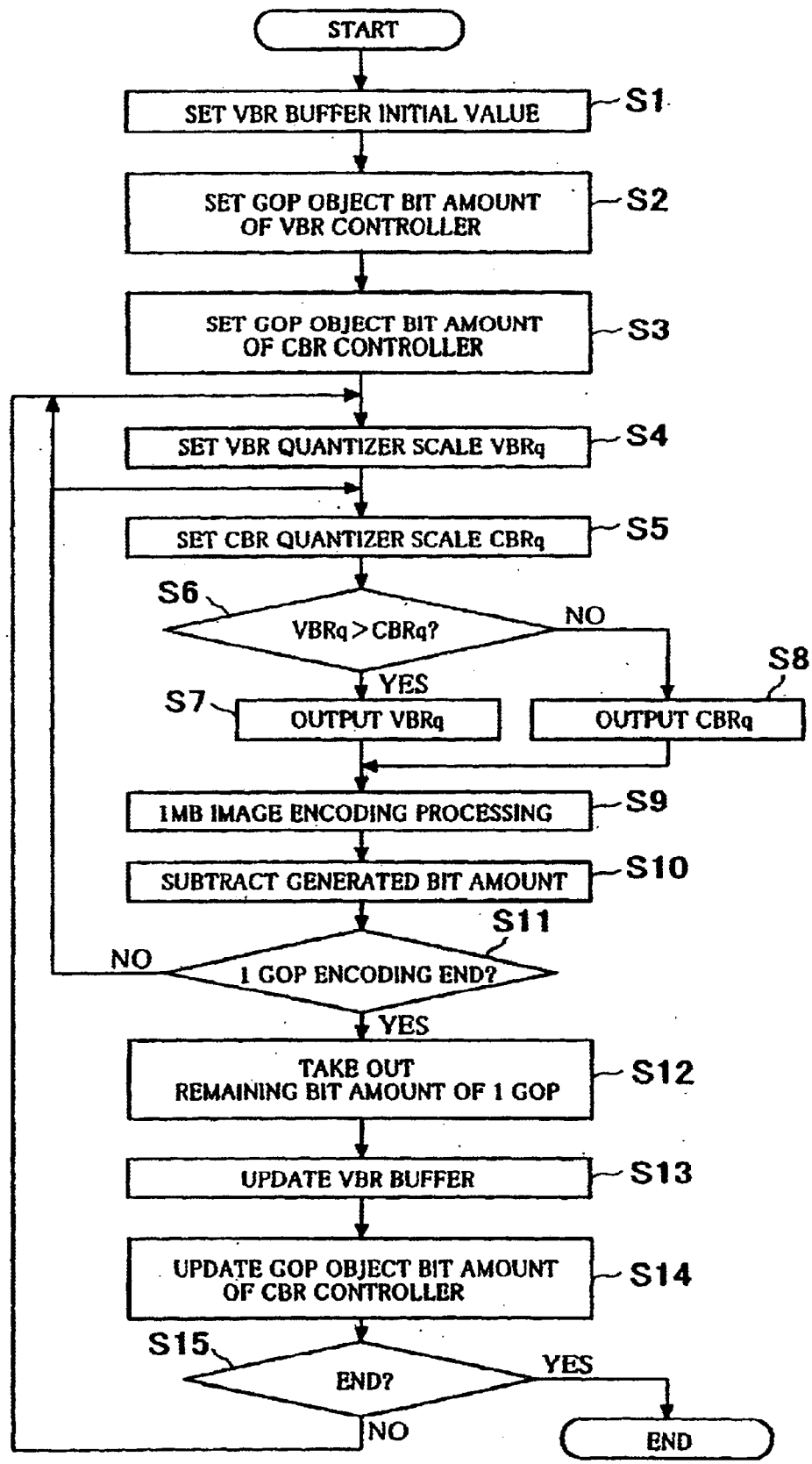
FIG. 5 is a flow chart of an operation of an image encoder of the present embodiment.

FIG. 5 is a flow chart of the operation of an image encoder of the present embodiment. Below, the operation of the image encoder of the present embodiment will be explained by using specific examples of parameter values with reference to FIG. 5.

FIG. 5 is a flow chart of the operation when encoding an image at a variable bit rate, namely, a flow chart of image encoding in the case where the VBR instruction signal VBD in FIG. 3 is "1". When the VBR instruction signal VBD is "0", the image is encoded at a normal constant bit rate, the next GOP's object bit quantity is calculated only in the CBR controller 23 from equation (4) in accordance with the object bit rate $BR_{obj}$ and the remaining bit quantity $\Delta R_i$ in the GOP immediately before, and in accordance therewith, an encoding scale in the next GOP is controlled. The image is generally encoded based on the constant bit rate in an image encoder to which the normal MPEG2 standard is applied, so a detailed explanation of the operation will be omitted here.

As shown in FIG. 5, after starting the encoding, first, the initial value of the VBR buffer value VBRb is obtained from equation (2) in accordance with given parameters (step S1). Here, for example, when $BR_{obj}$=4 Mbps, maximum bit rate $BR_{max}$=8 Mbps, VBR response speed VBRr=300, further, m=2.5×10$^7$ and k=10 in equation (2), the VBR buffer value VBRb becomes (2.5×10$^7$×300/(4×10$^6$×2$^{10}$))=192000 0.

Next, as shown in step 2, the object bit quantity of the GOP is obtained in the VBR controller 22 based on equation (3). Note that in equation (3), when assuming that GOPs are units of 15 picture, N=15 stands. Furthermore, for example when encoding a television image signal in an NTSC format, the respective fields are updated at 29.97 Hz and the picture rate PCR at this time becomes 29.97 in this case. Therefore, the GOP's object bit rate becomes (4×10$^6$×15/29.97)= 2002002.

Then, as shown in step S3, the GOP object bit rate is obtained in the CBR controller 23 in accordance with the maximum bit rate $BR_{max}$. Here, the object bit quantity of the CBR becomes (8×10$^6$×15/29.97)=4004004 in accordance with the maximum bit rate $BR_{max}$ and number of pictures N and picture rate PCR of the GOP.

Next, the processing shown in step S4 is performed. Namely, the VBR quantizer scale VBRq is obtained from equation (1) based on the VBR buffer value VBRb obtained above. In equation (1), when assuming n=9, the VBR quantizer scale VBRq becomes (0920000/(29×300))=12.5. Note that since an integer is required for the quantizer scale, the variable quantizer scale VBRq=13 is set here.

When the picture coding type is 1 or 2, that is, in a case of an I- or P-picture, the variable quantizer scale VBRq=13 is set, while when the picture coding type is 3, that is, in a case of a B-picture, the variable quantizer scale is set at a value of a quantizer scale calculated from equation (1) multiplied with 1.4. Namely, in the case of a B-picture, VBRq=18 is set.

Next, as shown in step S5, the CBR quantizer scale CBRq is obtained in the CBR controller 23 in accordance with the maximum bit rate $BR_{max}$.

The processing shown in step S6 is performed in the quantizer scale comparator 25. the VBR quantizer scale VBRq and the CBR quantizer scale CBRq are compared and the larger, as a result of the comparison, is output to the image compression encoder 24 (steps S7 and S8).

The image compression encoder 24 encodes the input image signal in units of 1 MB by using the quantizer scale provided from the quantizer scale comparator 25 (step S9). Then, as shown in step S10, a bit quantity generated from the encoding is subtracted from the set GOP object bit quantity. The processing from steps S4 to S10 are repeated until encoding all of the image signal of 1 GOP. After completing the encoding on 1 GOP, a remaining bit quantity RBG of the 1 GOP is taken out in step S12. The VBR buffer value is updated in the VBR controller 22 in accordance with the remaining bit quantity RBG (step S13).

A remaining bit quantity ΔR of the GOP is calculated in accordance with the generated bit quantity in the CBR controller 23, and in accordance therewith, an object bit quantity of the GOP in the CBR controller 23 is updated based on equations (5) and (6) (step S14). As explained above, when the remaining bit quantity ΔR in the GOP immediately before is negative, the next GOP's object bit quantity is calculated based on equation (5), while when the remaining bit quantity ΔR in the GOP immediately before is positive or "0", the next GOP's object bit quantity is calculated based on equation (6).

At step S15, whether or not to end the image encoding is judged. When the encoding should continue, the processing returns to step S4 and the next GOP is encoded.

In this way, the processing from steps S4 to S15 is repeated, so the input image signal is encoded for every GOP.

Note that the above processing is not limited to units of GOPs. The encoding may be performed for example in units of pictures. Also, the steps in the encoding can be realized in different orders and other processing steps may be further added in accordance with need. For example, in several pictures or several GOPs immediately after starting the processing, it is also possible to encode an input image signal at a constant bit rate set in accordance with the object bit rate $BR_{obj}$ by the CBR controller 23 so as to set parameters of the encoding in accordance with the processing result in the pictures or GOPs and to shift to encoding at a variable bit rate thereafter.

Here, image encoding when the encoding difficulty the input image signal is changed will be explained. At first, assume that an input image for a while after starting the encoding has an encoding difficulty of an extent that the bit quantity becomes not more than the maximum bit rate $BR_{max}$ when encoding by using the quantization rates 13 and 18 calculated at step S2.

In the encoding, the generated bit quantity for every MB is added up in the CBR controller 23. The total generated bit quantity is subtracted from the object bit quantity R in each picture to calculate a remaining bit quantity ΔR. Then, the CBR controller 23 reduces the CBR quantizer scale so that the remaining bit quantity ΔR comes close to "0". After reducing the CBR quantizer scale, the VBR quantizer scale and the CBR quantizer scale are compared in the quantizer scale comparator 25 and the larger, as a result of the comparison, is provided to the image compression encoder 24 as the base quantizer scale, thus, a large remaining bit quantity ΔR is left at the end of the next GOP quantization.

Here, for example, when assuming that the generated bit quantity in the GOP is 3×10⁶, the remaining bit quantity $\Delta R_i$ becomes 1004004 with respect to the object bit quantity of 4004004. In an image encoder to which the TM5 of the normal MPEG2 is applied, the above remaining bit quantity ΔR is to be added to the next GOP's object bit quantity, however in the present embodiment, since the remaining bit mount ΔR is positive, feedback by the remaining bit quantity is not performed and the next GOP's object bit quantity R is obtained based on the maximum bit rate $BR_{max}$ as shown in equation (6). Namely, the next GOP's object bit quantity becomes 4004004.

On the other hand, in the VBR controller 22, the bit quantity generated for every MB is subtracted from the remaining bit quantity RBG of the GOP calculated based on equation (3). In the above conditions, when the remaining bit quantity RBG of the GOP calculated based on equation (3) is 2002002 and the total of the generated bit quantity of the MBs in 1 GOP is 3000000 (3×10⁶), the remaining bit quantity at the end of the GOP becomes (2002002−3000000)=−997998. When the value is subtracted from the VBR buffer value VBRb, it is (1920000−(−997998))= 2917998. In accordance therewith, the VBR quantizer scale VBRq in the next GOP can be obtained by equation (2). The VBRq=(2917998/(29×300))=19 stands. In this way, the VBR quantizer scale changes for every GOP and it is possible to prevent the generated bit quantity from largely departing from the object bit quantity.

Next, suppose that an image having a high encoding difficulty which exceeds the maximum bit rate $BR_{max}$ is input with the VBR quantizer scale obtained above. In this case, the CBR quantizer scale rapidly increases during one picture and exceeds the VBR quantizer scale, so as a result of comparing the VBR quantizer scale VBRq and the CBR quantizer scale CBRq in the quantizer scale comparator 25, the larger CBR quantizer scale is provided as a base quantizer scale to the image compression encoder 24. This state is equal to encoding by CBR rate control at the maximum bit rate. After a while, since the VBR quantizer scale becomes larger, the VBR quantizer scale VBRq is selected again by using the quantizer scale comparator 25 and output to the image compression encoder 24.

As explained above, when encoding an input image at a variable bit rate by one encoding operation, it has to be guaranteed that the maximum bit rate not be exceeded when the encoding difficulty is abruptly heightened. By using the CBR controller 23 normally provided in an image encoder, the VBR rate control can be realized without largely changing the configuration of the image encoder. Also, when the CBR controller 23 is not used as in the present embodiment, since the VBV buffer comes close to underflowing, the picture quality is deteriorated by cutting the DCT coefficient by the image compression encoder 24, but in the present embodiment, this can be prevented.

The VBR buffer value VBRb is output to the VBR buffer memory 21 at the end of the encoding and stored therein. The stored value becomes an initial value of the VBR buffer value VBRb at the time of starting the next encoding, so the VBR buffer value VBRb becomes the value when completing the previous encoding.

Figure 6:
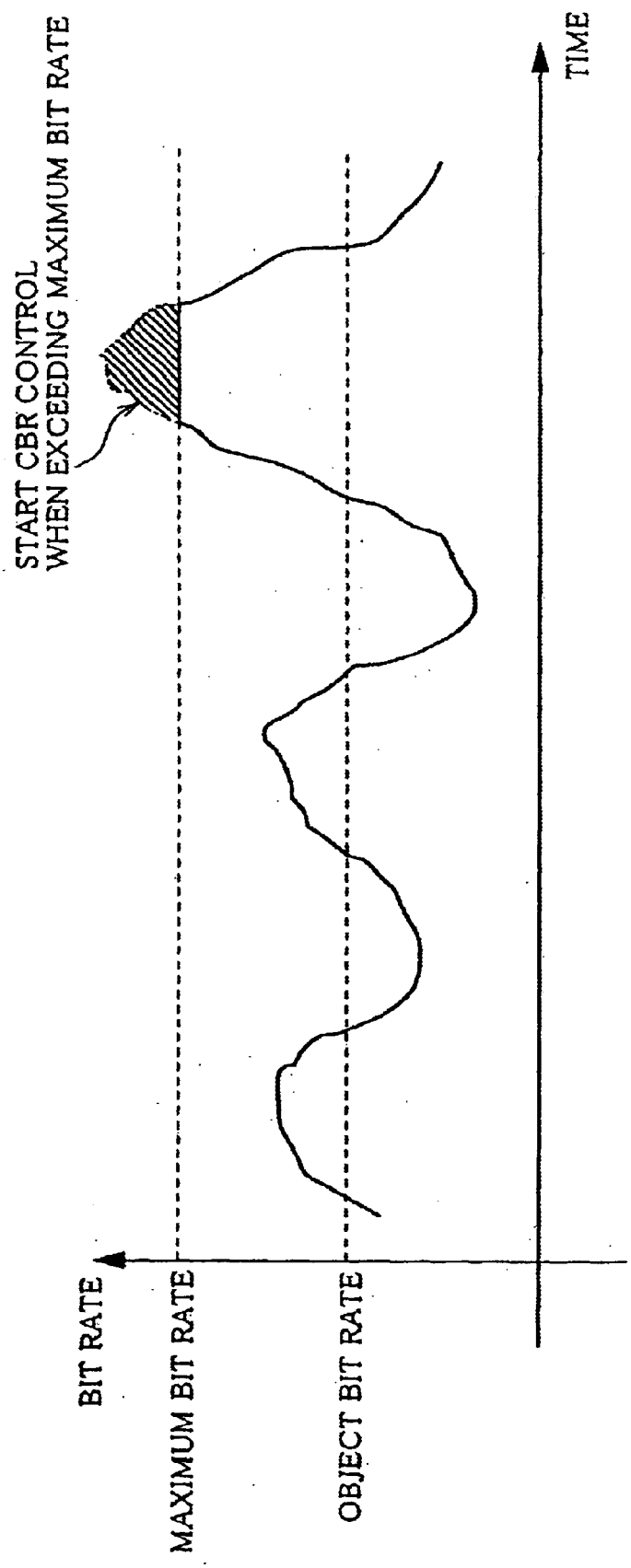
FIG. 6 is a view of an example of an image encoding bit rate in an image encoder of the present embodiment.
Figure 7:
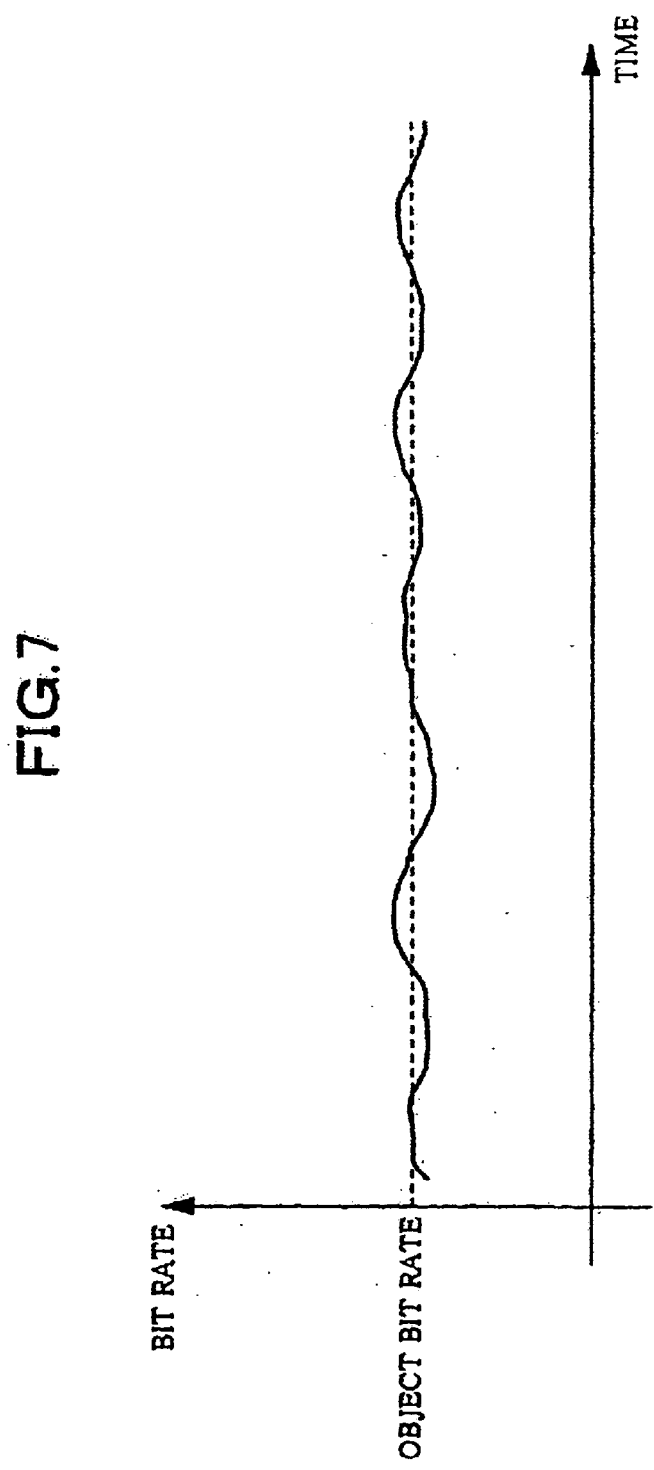
FIG. 7 is an example of an image encoding bit rate by constant bit rate control of the related art.
Figure 8:
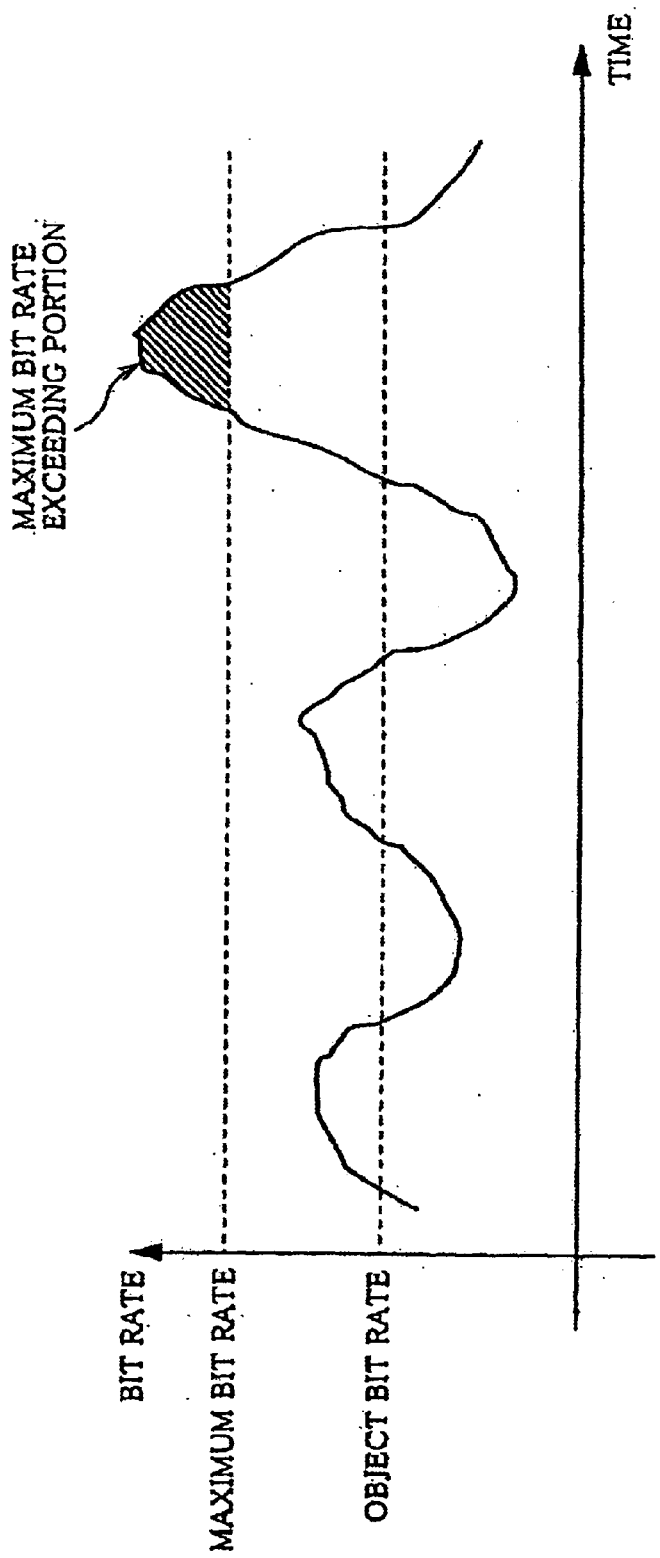
FIG. 8 is a view of a case of exceeding a maximum bit rate subscribed by standards due to characteristics of an image in variable bit rate control of the related art.

FIG. 6 is a view of a bit rate in image encoding processing in an image encoder of the present embodiment. As shown in FIG. 6, a bit rate of an image gently changes about an object bit rate in accordance with the encoding difficulty. Namely, VBR control is performed. When a complex image is input and the encoding bit rate possibly exceeds a predetermined maximum bit rate, prescribed by image encoding standards, the CBR control starts functioning to control so that the bit rate does not exceed the maximum bit rate. Due to the controlling, the image encoder of the present invention is capable of maintaining picture quality almost uniform by variably controlling the bit rate in accordance with the encoding difficulty of an image while observing the maximum bit rate prescribed by the standards.

INDUSTRIAL APPLICABILITY

As explained above, according to the image encoder and the method of the present invention, compression and encoding of an image signal at a variable bit rate by one encoding operation can be realized. Furthermore, by effectively using a general encoding circuit, there is an advantage that variable bit rate processing can be realized in an application in which real-time encoding is required without largely changing the circuit configuration.

What is claimed is:

1. An image encoder, comprising:
   a first quantizer scale setting means for setting a first quantizer scale in a first image processing unit in accordance with an input image signal so as to attain an object bit rate;
   a second quantizer scale setting means for setting a second quantizer scale in a second image processing unit which is shorter than said first image processing unit in accordance with said input image signal so as not to exceed a maximum bit rate prescribed in advance; and
   an encoding means for performing encoding processing on said input image signal by using the larger of said first and second quantizer scales.

2. An image encoder as set forth in claim 1, wherein said first image, processing unit is a GOP (Group of Picture: an image group including a plurality of picture) unit.

3. An image encoder as set forth in claim 1, wherein said second image processing unit is a macroblock unit.

4. An image encoder as set forth in claim 1, wherein said second image processing unit is a macroblock unit.

5. An image encoder, comprising:
   a first quantizer scale setting means for setting a first quantizer scale in a first image processing unit in accordance with an input image signal so as to attain an object bit rate;
   a second quantizer scale setting means for setting a second quantizer-scale in a second image processing unit which is shorter than said first image processing unit in accordance with said input image signal so as not to exceed a maximum bit rate prescribed in advance;
   a quantizer scale selecting means for selecting the larger of said first and second quantizer scales; and
   an encoding means for performing encoding processing on said input image signal by using said quantizer scale selected by said quantizer scale selecting means.

6. An image encoder as set forth in claim 5, wherein said first image processing unit is a GOP (Group Of Picture: an image group including a plurality of picture) unit.

7. An image encoder as set forth in claim 5, wherein said first quantizer scale setting means sets an object bit amount of encoding processing in said first image processing unit.

8. An image encoder as set forth in claim 5, wherein said first quantizer scale setting means sets said first quantizer scale in accordance with a remaining amount of encoding bits and a response speed in the immediately previous said first image processing unit.

9. An image encoder as set forth in claim 5, comprising a memory means for storing a remaining amount of encoding bits in said first image processing unit; and wherein said first quantizer scale setting means sets an object bit amount in the next said first image processing unit in accordance with the remaining amount of encoding bits stored in said memory means.

10. An image encoder as set forth in claim 5, wherein said second quantizer scale setting means sets an object bit amount in the next said second image processing unit for every said second image processing unit.

11. An image encoder as set forth in claim 5, wherein said second quantizer scale setting means sets an object bit amount in the next said second image processing unit in accordance with the object bit rate and a remaining amount of encoding bits in the immediately previous said second image processing unit when instructed to encode an image by said second quantizer scale.

12. An image encoder as set forth in claim 5, wherein said second quantizer scale setting means sets an object bit amount in the next said second image processing unit in accordance with the maximum bit rate and a remaining amount of encoding bits in the immediately previous said second image processing unit when instructed to encode an image by said first quantizer scale.

13. An image encoder as set forth in claim 12, wherein said second quantizer scale setting means sets an object bit amount in the next said second image processing unit in accordance with the remaining amount of encoding bits and the maximum bit rate when a remaining amount of encoding bits in the immediately previous said second image processing unit is negative.

14. An image encoder as set forth in claim 12, wherein said second quantizer scale setting means sets an object bit amount in the next said second image processing unit in accordance with the maximum bit rate and regardless of the remaining amount of encoding bits when a remaining amount of encoding bits in the immediately previous said second image processing unit is positive or "0".

15. An image encoder as set forth in claim 5, further comprises an instruction signal for instructing to perform image encoding processing by using either one of the first quantizer scale or the second quantizer scale, and a control means for respectively outputting the object bit rate and the maximum bit rate to said first quantizer scale setting means and said second quantizer scale setting means.

16. An image encoder as set forth in claim 15, wherein said control means outputs said instruction signal to said quantizer scale selecting means.

17. An image encoder as set forth in claim 15, wherein said control means outputs said instruction signal to instruct to perform processing by said first quantizer scale in said first processing unit on said input image signal when instructing image encoding processing by said first quantizer scale.

18. An image encoder as set forth in claim 17, wherein said control means outputs said instruction signal to instruct to switch to image encoding processing by said first quantizer scale when image encoding processing by said second quantizer scale in said second image processing unit is completed.

19. An image encoding method, including the steps of: setting a first quantizer scale in a first image processing unit in accordance with an input image signal so as to attain an object bit rate; setting a second quantizer scale in a second image processing unit which is shorter than said first image processing unit in accordance with said input image signal so as not to exceed a maximum bit rate prescribed in advance; and performing encoding processing on said input image signal by using the larger of said first and second quantizer scales.

20. An image encoding method as set forth in claim 19, wherein an object bit amount in said first image processing unit is set and said first quantizer scale is set in accordance with a remaining amount of encoding bits and response speed in the immediately previous said first image processing unit when performing image encoding processing by using said first quantizer scale.

21. An image encoding method as set forth in claim 19, wherein if said first quantizer scale calculated in accordance with a remaining amount of encoding bits and response speed in the immediately previous said first image processing unit is smaller than a reference value, the reference value is set as a quantizer scale in the next said first image processing unit when performing image encoding processing by using said first quantizer scale.

22. An image encoding method as set forth in claim 19, wherein said first image processing unit is a GOP unit.

23. An image encoding method as set forth in claim 19, wherein said second image processing unit is a macroblock unit.

24. An image encoding method as set forth in claim 19, wherein:

an object bit amount in the next said second image processing unit is set for each of second image processing units when determining said second quantizer scale;

an object bit amount in the next said second image processing unit is set in accordance with an object bit rate and a remaining amount of encoding bits in the immediately previous said second image processing unit when instructed to perform image encoding processing by said second quantization scale; and an object bit amount in the next said first image processing unit is set in accordance with a maximum bit rate and the remaining amount of encoding bits in the immediately previous said first image processing, unit if the remaining amount of encoding bits in the immediately previous said first image processing unit is negative, while, an object bit amount in the next said first image processing unit is set in accordance with said maximum bit rate regardless of the immediately previous said first image processing unit when instructed to perform image encoding processing by said first quantizer scale.

25. An image encoding method as set forth in claim 19, for performing image encoding processing by said second quantizer scale in said second image processing unit on said input image signal, and then, performing image encoding processing by said first guantizer scale in accordance with a result of the encoding processing by the second quantizer scale when performing image encoding processing by said first quantizer scale.

* * * * *